United States Patent Office 2,702,252
Patented Feb. 15, 1955

2,702,252

METHOD OF DEPOSITING RHODIUM METAL ON PRINTED CIRCUITS

Lydia A. Suchoff, Asbury Park, N. J., assignor to the United States of America as represented by the Secretary of the Army No Drawing. Application October 2, 1953, Serial No. 383,942

5 Claims. (Cl. 117—45)

(Granted under Title 35, U. S. Code (1952), sec. 266)

The invention described herein may be manufactured and used by or for the Government for governmental purposes, without the payment of any royalty thereon.

This invention relates to a method of depositing rhodium metal on printed circuits.

Copper clad insulating materials have proved to be very useful and adaptable in the fabrication of printed circuits. However, various difficulties have been experienced during the aging of such printed copper diagrams, particularly where they are used for switches, connectors, or other components having moving parts. To protect the surface of the copper from oxidation or corrosion and to make it more resistant to wear, it has been proposed to cover the surface of the diagram with a very thin film of a noble metal, or plastic or other appropriate materials. The current practice of electroplating noble metals on the copper diagram of a printed circuit is time and material consuming because of the special steps involved in electroplating a noncontinuous circuit.

It is well known that even at room temperature most metals show a marked mobility of the uppermost atoms in the plane of the top layer, which mobility creates certain rearrangements (recrystallization) of the atoms on the surface. Corrosion and oxidation add to these processes and bring about a change in the total conductivity of the copper circuit, which change may materially disturb the efficiency of the electronic instrument that has been assembled with the aid of such printed circuits. All of these difficulties are markedly increased if the copper diagram is used for switches or connectors or other components having moving parts.

It is an object of the invention to overcome the unfavorable aging characteristics and the low wear resistance of a printed copper circuit by depositing an extremely thin coating of rhodium on the surface of the copper diagram. The rhodium is deposited according to the invention from its solution at ordinary temperatures, without employing the methods of electroplating and without using any chemical reducing agents. I have found that a solution of rhodium chloride in hydrochloric acid is capable of depositing on the copper surface an extremely fine, almost monomolecular, coating of metallic rhodium and that such film sufficiently protects the copper against both corrosion and wear. It must be assumed that this extremely thin layer of rhodium has the capacity of inhibiting the mobility of the uppermost copper atoms in the top layer and thus inhibit corrosion and wear.

W. H. Wollaston (Philosophical Transactions, vol. 94, p. 419, 1804, and vol. 119, p. 1, 1829) noted that some metals, for instance copper precipitate rhodium as a black powder from their aqueous solution. (See J. W. Mellor: "Comprehensive Treatise on Inorganic and Theoretical Chemistry," vol. 25, p. 575.)

The present invention, however, is based on the discovery that the very first deposition of rhodium on a copper surface occurs in the form of a strongly adherent, non-spongy layer having the appearance of a silver mirror. Once this precipitate starts to grow in thickness it becomes spongy, gray and eventually turns into a black powder. A spongy film of rhodium is of no protective use to the copper surface. If, however, according to the invention the precipitation of rhodium from its solution on the copper surface is interrupted before the film becomes spongy, the resulting rhodium layer effectively protects the underlying copper film.

The following specific embodiments of the broad inventive idea will illustrate some of the details of the invention.

A water soluble hydrate of rhodium chloride ($RhCl_3$) is dissolved in diluted hydrochloric acid. Good results are achieved with a solution containing about 10 to 20% rhodium chloride in 90 to 80% of an aqueous solution containing about 5 to 50% hydrochloric acid. The higher the percentage of rhodium chloride the faster the film will form. Above 20% of rhodium chloride in the solution the film forms too fast and does not adhere as well.

The printed circuit may be dipped into the bath either at room or elevated temperatures up to about 70 to 80° C. The rhodium film starts to form very quickly almost instantaneously and shows a tendency to become spongy after a few minutes. It is advantageous to remove the film from the bath as soon as the copper color of the copper diagram has disappeared. After the required thickness of the silvery rhodium film has been attained and before the film turns spongy the printed circuit is removed from the bath, washed and dried and is then ready for use.

Printed circuits the copper diagram of which has been coated with a film of rhodium according to the invention have an almost unlimited shelf life and great wear resistance. The electrical resistance of the copper diagram remains constant during the lifetime of the rhodium film.

It is evident to those skilled in the art that various changes may be made in the composition of the bath containing the rhodium salt and the condition under which the film is formed.

What is claimed is:

1. A method of coating the copper diagram of a printed circuit with rhodium comprising dipping the printed circuit into a bath containing a rhodium salt, allowing the rhodium to be precipitated on the copper surface and removing the printed circuit from the bath before the rhodium film starts to become spongy.

2. A method of coating the copper diagram of a printed circuit according to claim 1 in which the bath comprises a solution of rhodium hydrochloride in diluted hydrochloric acid.

3. A method of coating the copper diagram of a printed circuit according to claim 1 in which the bath comprises between about 10 to 20% rhodium chloride dissolved in 90 to 80% of an aqueous solution containing about 5 to 50% hydrochloric acid.

4. A method of coating the copper diagram of a printed circuit according to claim 1 in which the printed circuit is removed from the bath as soon as the copper color of the copper diagram is replaced by the silvery color of metallic rhodium.

5. A method of coating the copper diagram of a printed circuit according to claim 1 in which the bath containing the rhodium salt is used at temperatures not exceeding about 80° C.

References Cited in the file of this patent

Brunetti: Printed Circuit Techniques National Bureau of Standards, Circular 468, November 15, 1947, page 20.

Atkinson: Metal Industry, vol. 32, No. 4, April 1934, page 119.